(12) United States Patent
Reidhar

(10) Patent No.: US 7,322,302 B1
(45) Date of Patent: Jan. 29, 2008

(54) SEEDLING PLANTER

(76) Inventor: John T. Reidhar, 3638 Reidhar La., Des Arc, AR (US) 72040

( * ) Notice: Subject to any disclaimer, the term of this patent is extended or adjusted under 35 U.S.C. 154(b) by 358 days.

(21) Appl. No.: 11/103,422

(22) Filed: Apr. 11, 2005

(51) Int. Cl.
*A01C 5/00* (2006.01)
*A01C 11/00* (2006.01)
*A01C 13/00* (2006.01)
*A01G 23/02* (2006.01)

(52) U.S. Cl. .................... 111/101; 111/102; 111/112; 111/165; 111/185

(58) Field of Classification Search .......... 111/101, 111/102, 112, 157, 163–165, 190–191, 194, 111/195
See application file for complete search history.

(56) References Cited

U.S. PATENT DOCUMENTS 713,976 A * 11/1902 Funk .................... 111/165
4,308,811 A * 1/1982 Bass .................... 111/112
4,344,374 A   8/1982 Gangluff
5,704,431 A * 1/1998 Lefebvre ................ 172/177

\* cited by examiner

*Primary Examiner*—Christopher J. Novosad
(74) *Attorney, Agent, or Firm*—Stephen D. Carver

(57) ABSTRACT

A heavy-duty seedling planter for reforestation comprises specially configured coulter wheels that form a unique seedbed furrow. An elongated, rigid frame includes a front towing connection, and a rear strut for mounting trailing furrow compaction wheels. The planter is towed over the ground by an agricultural tractor and an operator seated within a cab dispenses seedlings. The coulters are spaced apart from one another along the frame. Both coulters are towed in approximately ten degrees and positively cambered approximately three degrees. The axes of rotation of the coulters are neither coaxial, coincident, collinear nor coplanar. The trailing coulter almost touches the midpoint of the leading coulter. Dual convex packer wheels trailing the frame compress soil, close the furrow, and create twin, parallel irrigation trenches.

7 Claims, 11 Drawing Sheets

SEEDLING PLANTER

BACKGROUND OF THE INVENTION

I. Field of the Invention

The present invention relates generally to excavating transplanters of the type otherwise known as tree or seedling planters. More particularly, the present invention relates to seedling planters that first cut a deep furrow with front-mounted coulter blades, and then close the furrow with trailing packer wheels after a seedling has been properly placed. Prior art of relevance to the invention is classified in United States Patent Class 111, Subclasses 101, 107, 109 and 112.

II. Description of the Prior Art

The ever-increasing worldwide demand for timber has aggravated the need for reliable and efficient replanting methods. The prior art includes numerous, mechanized seedling planters. Typically, a rigid frame includes a one or more front-mounted, ground-engaging coulter blades. Where a pair of coulter blades is employed, the coulter blades are usually angularly mounted, i.e., toed in. The coulter blades open a furrow as the device is propelled or towed. They are mounted such that the axis of rotation of each blade, while not collinear or coaxial, is coplanar. In other words, known coulter-equipped seedling planters mount the front coulter blades in a configuration similar to a three-point tractor.

After the furrow is forcibly excavated, seedlings are dropped into the resultant seedbed, either manually or through an associated feeder mechanism. Typically, the furrow is closed by a pair of trailing packing wheels, that are angularly mounted adjacent one another, and penetrate the ground adjacent furrow sidewalls. The packer wheels repack soil about the seedling roots to close the furrow, with the seedlings positioned substantially vertically in a self-supporting orientation.

The planter seen in U.S. Pat. No. 4,344,374 issued Aug. 17, 1982 generally exemplifies the latter design approach. The heavy-duty seedling planter illustrated therein comprises a rigid frame supporting a rotatable coulter blade that opens a furrow. Seedlings are inserted into the furrow by a rotary feeder wheel system. The furrow is repacked by a pair of rigid, inclined, compacting wheels trailing the machine.

In certain areas of the country, the soil largely consists of various clays. During moist conditions, the soil sticks to the blades, and clumps around various components, interfering with proper operation. Fixed, rigidly mounted coulters, are particularly affected by the build-up of mud. The constant build-up of soil necessitates frequent shutdowns for cleaning. The build-up of clay around plow structures or coulter blades and their axles can, in some cases, block the passageway through which seedlings are dropped during the reforestation planting process.

SUMMARY OF THE INVENTION

This invention comprises a heavy-duty seedling planter that reliably enhances the process of seedling planting in large fields where trees are to be raised. The planter is capable of planting hardwood, pine and similar bare-root seedlings in all types of conditions from wet, heavy clay to dry loamy soils.

Preferably, the planter is towed over the ground by an agricultural, crawler type tractor, or similar machine of sixty horsepower or more. Alternatively, the planter may be mounted or semi-mounted to a three point hitch and provided with lift assist wheels. A pair of specially configured, ground-driven front coulters penetrates the ground and form a uniquely shaped, triangular furrow that provides a seedbed. The properly profiled seedbed favorably receives and positions young seedlings as they are planted. Preferably, the coulters run eighteen to twenty inches below the soil level. The front coulter wheels are preferably protected by optional, side-mounted skids for guarding against rocks, stumps, or other solid obstacles encountered during planting. Preferably, the front coulter blades are angled and staggered. They are toed in, and arranged with positive camber. Further, the axis of rotation of the trailing coulter is spaced apart and staggered from the axis of rotation of the front coulter. In other words, the two axes are neither collinear nor coaxial. Preferably, the coulters are mounted between two parallel beams that are attached to a tool bar carrier. The coulter discs are very sharp around their outer diameter in order to enhance soil penetration in extremely hard soils. Their angular placement results in a tapered, "V-shaped" furrow that is very narrow at the bottom, yet approximately two to three inches wide at the top.

After the furrow is opened by the front coulters, the operator drops seedlings manually through to the ground. Trailing the front coulter wheels that initially penetrate and engage the ground are a pair of spaced apart, packer wheels that close the furrow. These dual concave disks are preferably scalloped. On each side of the v-shaped furrow, the packer wheels penetrate the ground and effectively compress and reposition loosened dirt to close the furrow over the seedbed, with the seedling roots appropriately buried and the seedlings disposed substantially vertically for favorable initial growth. The preferred packer wheels remove air pockets that might otherwise form. Furthermore, the preferred configuration leaves irrigation trenches on either side of the closed furrow, so the young seedlings are more likely to enjoy favorable moisture conditions.

Thus, a basic object is to provide a seedling planter that improves seedling growth and survival.

A related object is to provide a seedling planter that sets up a V-shaped furrow profile to enhance the efficiency and survival rates of replanted seedlings.

Another important object is to provide a commercially viable seedling planter that removes air pockets.

Still another object is to create small irrigation ditches aside the planted furrow to insure the proper moisture level for freshly planted seedlings.

Another basic object is to provide a planter capable of planting hardwood seedlings, and pine and similar bare-root seedlings.

Furthermore, it is an important object to provide a seedling planter that functions favorably in heavy, wet clay soils.

Other objects of my invention are to provide a planter that will penetrate hard surface conditions, that will plant in muddy or dry soils with no modifications to the planter, that will plant in cleared farmland as well as in cut-over timberland, and that will plant in six to eight inches of water and still make a viable seed bed and firmly set the seedling.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 9 is an enlarged, fragmentary top view of the coulter disks, showing the preferred staggered mounting and the preferred toe-in;

DETAILED DESCRIPTION

Figure 2:
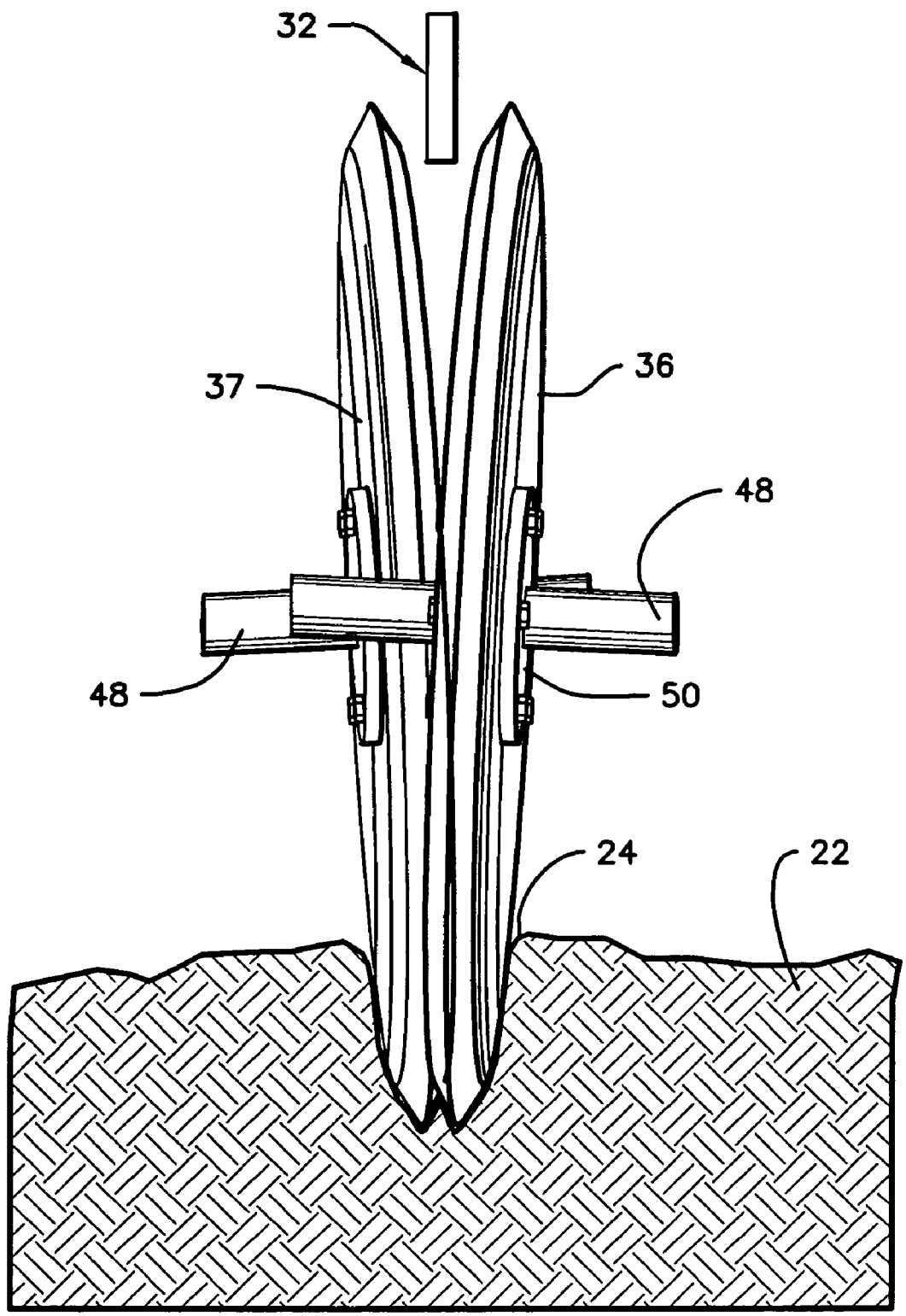
FIG. 2 is an enlarged, fragmentary, front plan view showing the front coulter blades cutting a furrow of the preferred shape.
Figure 3:
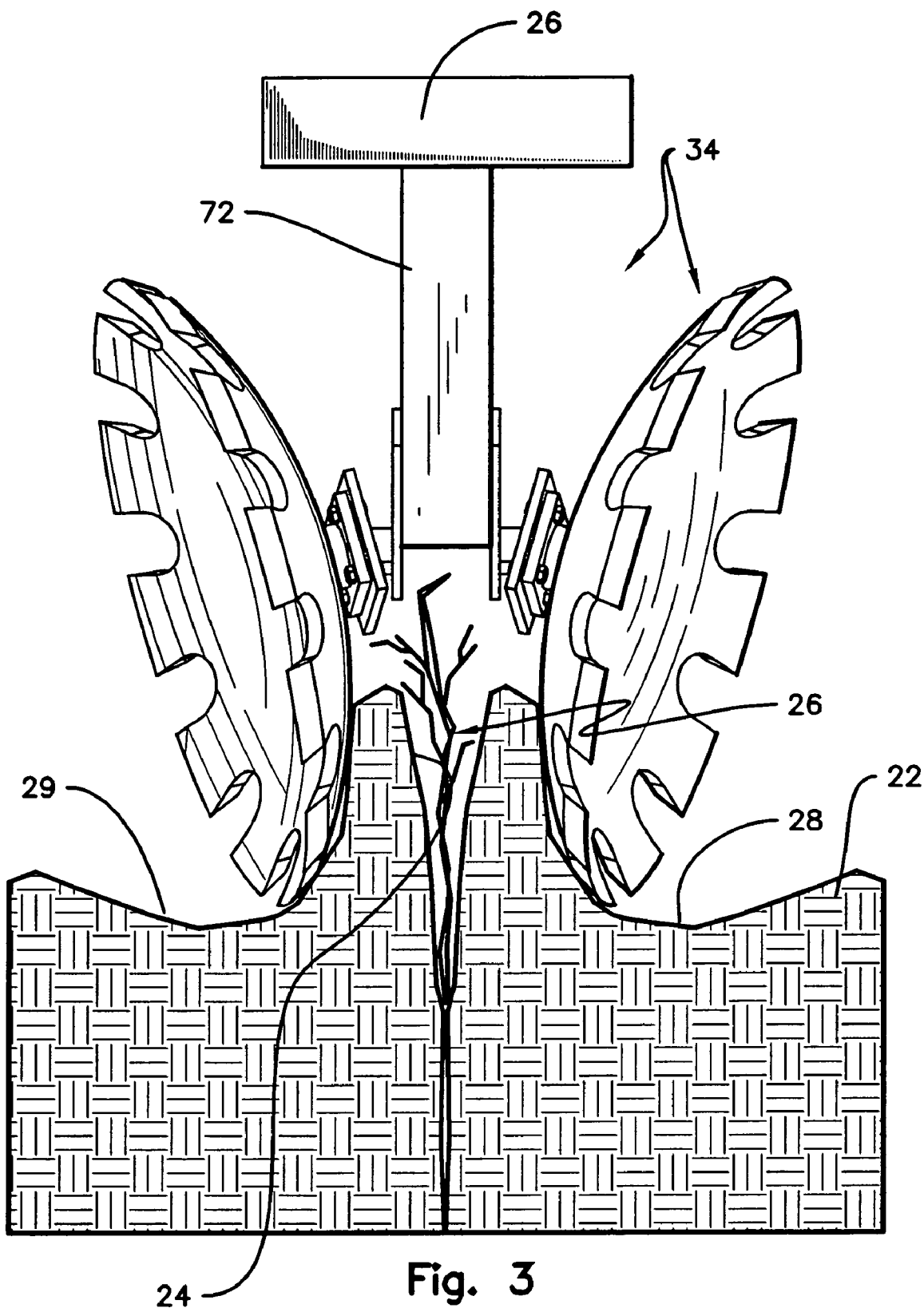
FIG. 3 is an enlarged, fragmentary, rear plan view showing the rear packer wheels closing the furrow after planting a seedling.
Figure 4:
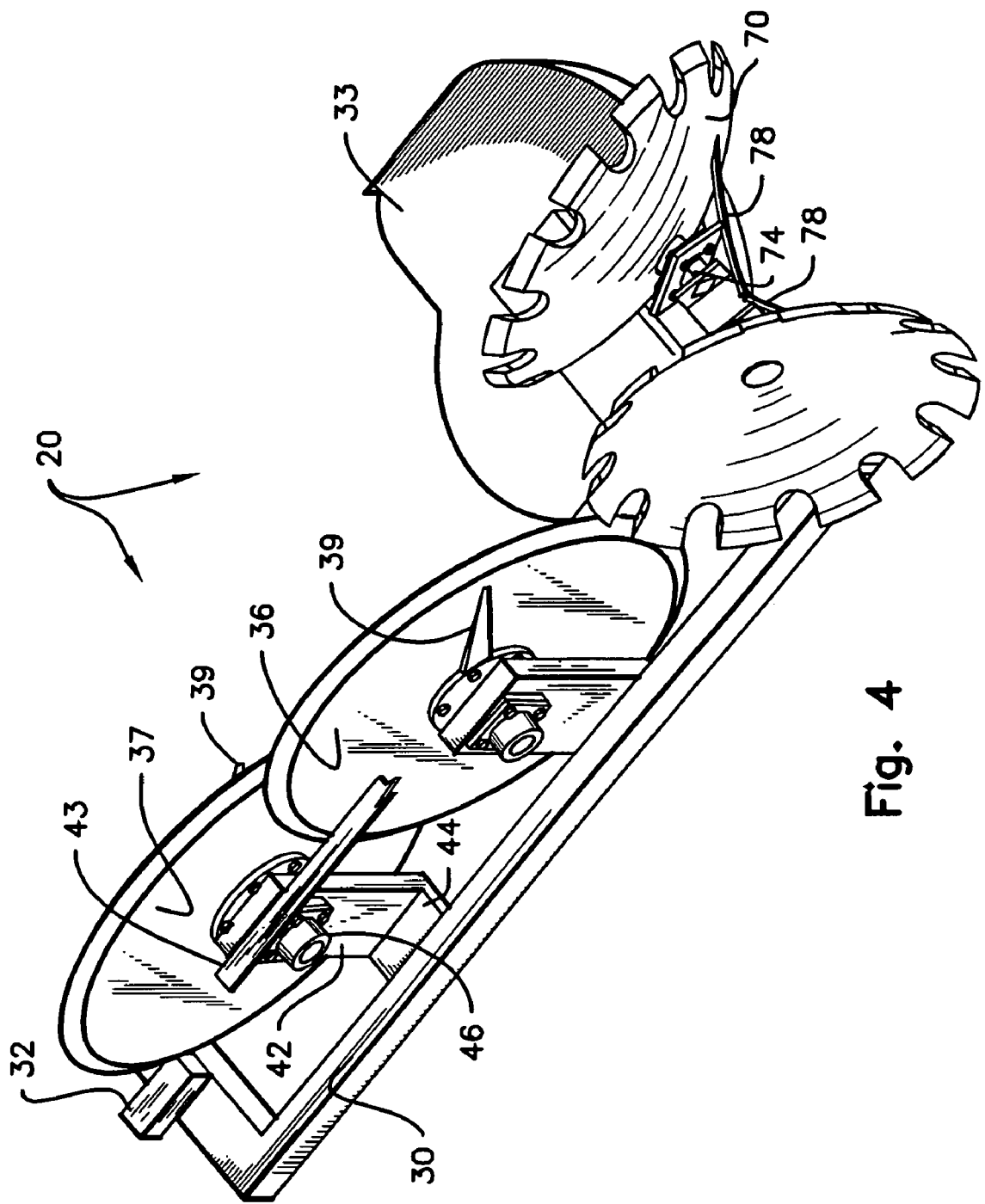
FIGS. 4 and 5 are fragmentary bottom isometric views.
Figure 5:
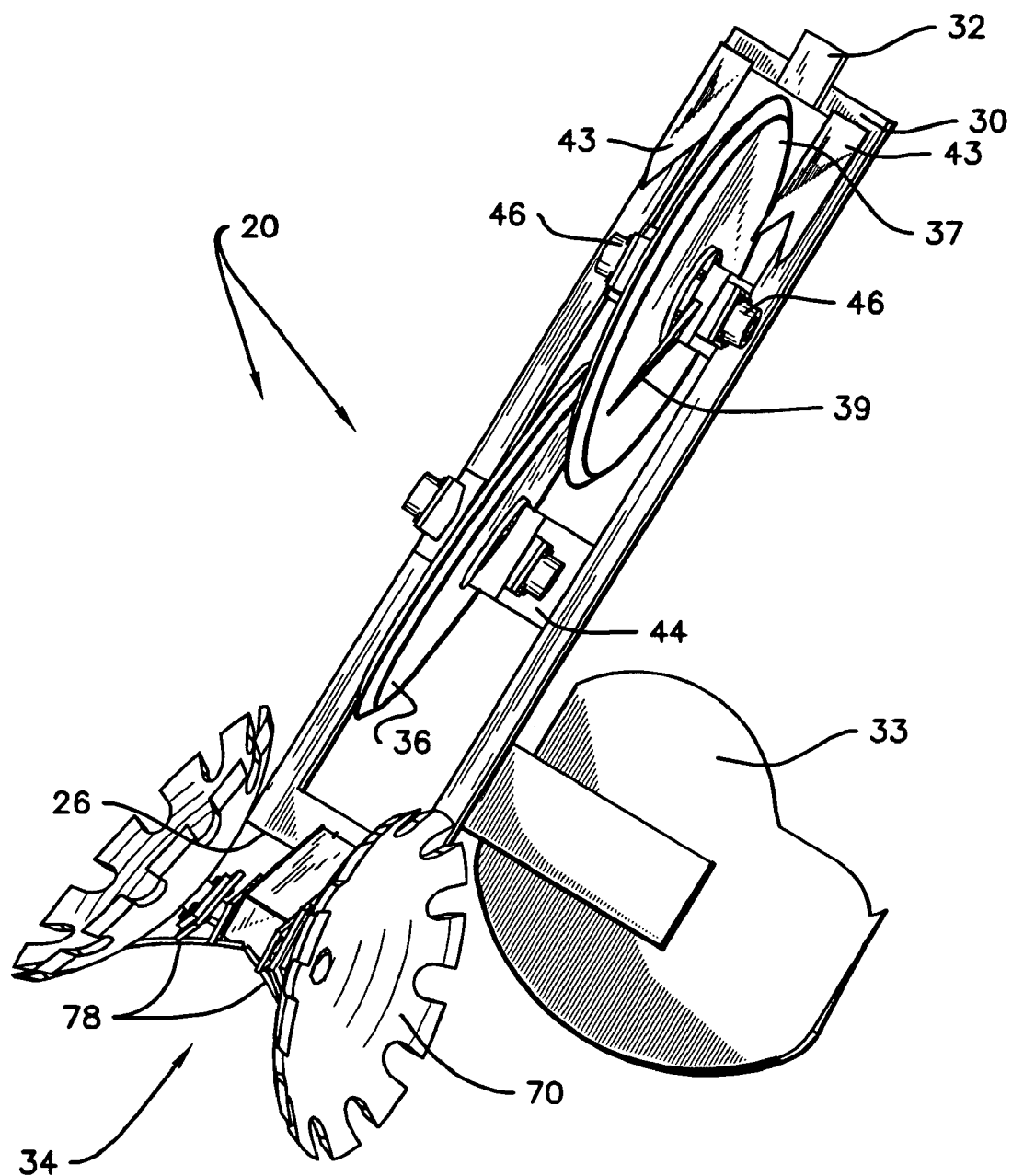
Figure 6:
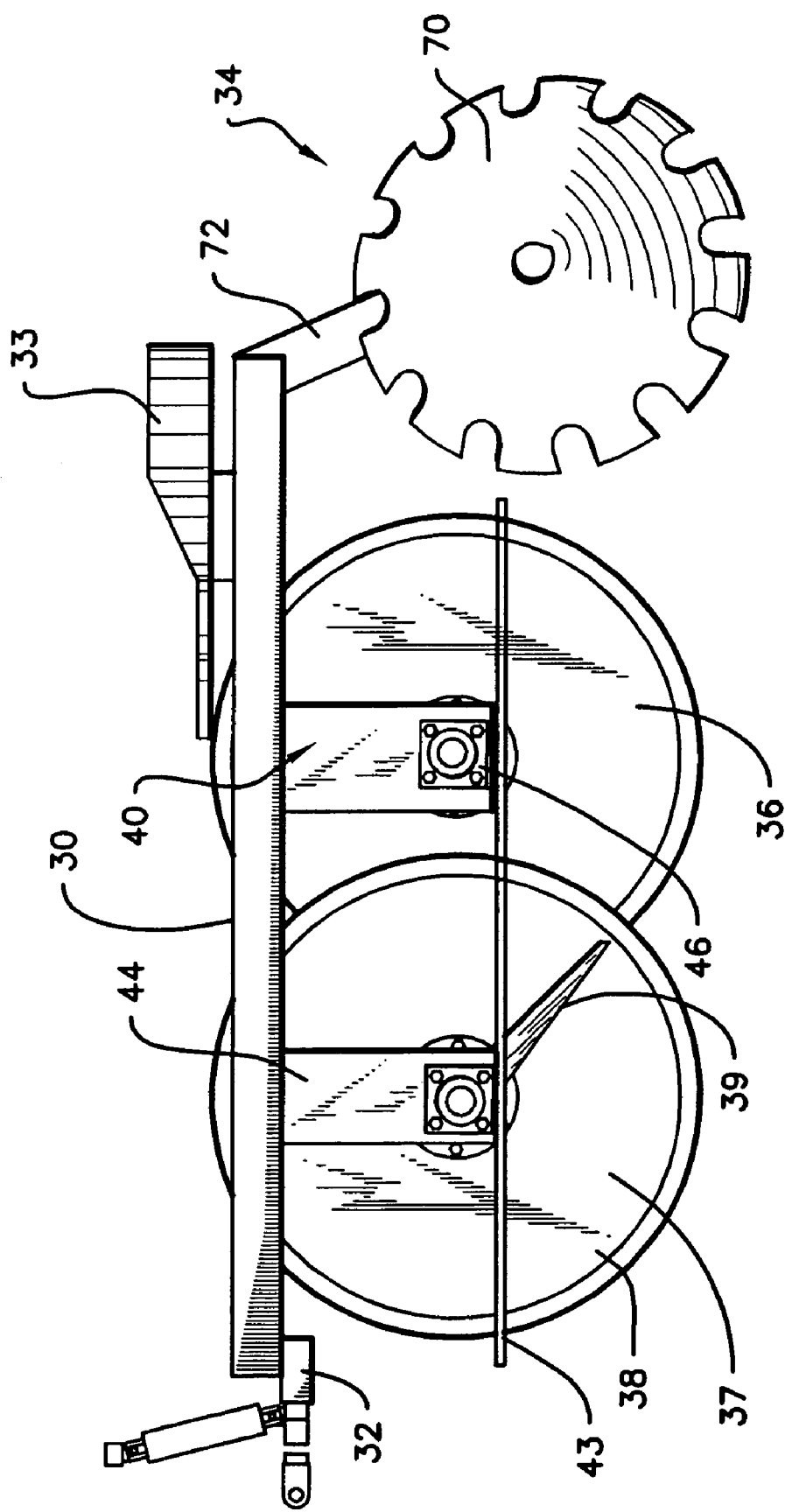
FIG. 6 is a fragmentary side view thereof.

With reference directed now to the appended drawings, my new heavy-duty seedling planter (i.e., transplanter) has been generally designated by the reference numeral 20. Planter 20 is adapted to be towed over field 22 (FIGS. 2, 3) to cut a furrow 24 (FIG. 2) that is suitably shaped to receive and reliably grow a plurality of tree seedlings 26 (FIG. 3). The construction disclosed not only provides a properly shaped furrow 24 that provides the desired seedbed, but in addition, a pair of smaller, shallower and parallel trenches 28, 29 formed by the trailing apparatus provide enhanced irrigation and moisture to insure reliable plant growth.

Planter 20 is capable of planting numerous types of seedlings. It may be used with hardwood, pine and similar bare-root seedlings in all types of conditions from wet, heavy clay conditions to applications over dry, loamy soils. However, the hereinafter described structure is particularly adept at handling moist, muddy clay soils that tend to clog and jam conventional tree seedling planters.

Planter 20 comprises an elongated rigid frame, generally designated by the reference numeral 30 that supports a suitable cab 31 that encloses a driver. Frame 30, the center of which is coincident with the longitudinal axis of the planter 20, supports a front tow connection point generally designated by the reference 32. The tow connection is entirely conventional, and preferably comprises a three point hitch connection so that the planter may be controlled and hydraulically deployed through original equipment tractor towing apparatus. A packer wheel assembly, generally designated by the reference numeral 34, is disposed at the frame rear to close the furrow after planting.

Figure 1:
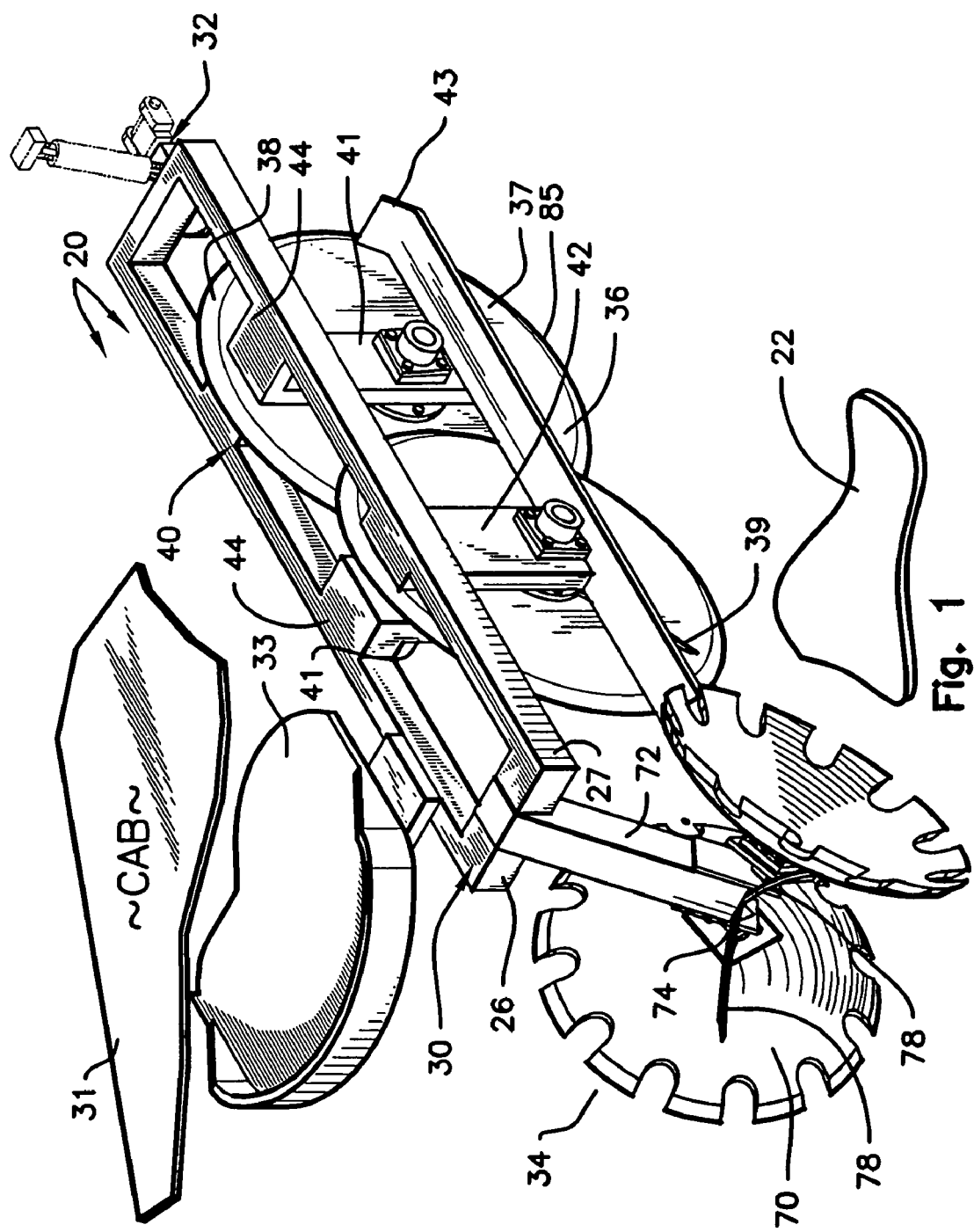
FIG. 1 is a fragmentary rear isometric view of my new seedling planter.

Frame 30 comprises a pair of spaced-apart rails 26 and 27 (FIG. 1). Preferably, a seat 33 is secured to the frame 30 within cab 31. Frame 30 has been illustrated in skeletal form. Planter 20 is towed over the ground in a direction running from left to right (i.e., as viewed in FIG. 1) by a suitable agricultural towing implement, such as a crawler type tractor or the like, preferably of sixty horsepower or more. In certain circumstances, for example where the operator must tow the planter over rural farm roads prior to reaching the replanting field, optional, conventional, hydraulically-activated lift assist wheels (not shown) may be mounted to frame 30.

A pair of specially configured, ground-driven, frame-mounted coulters 36 and 37 dig the furrow. They penetrate the ground and form the seed bed into a uniquely shaped, triangular profile. The coulters 36, 37 are preferably protected by optional, side-mounted sleds of conventional construction for guarding against rocks, stumps, or other solid obstacles that might be encountered during planting. To handle heavy, moist clay soils the coulters 36, 37 are mounted in a unique configuration. Preferably, the coulters are staggered; the trailing (i.e., the rear-most) coulter 36 is longitudinally spaced apart from the frontal or leading coulter 37. In other words, coulter 36 is behind coulter 37. The axis of rotation of the trailing coulter 36 is longitudinally spaced apart (i.e., relative to the frame) and staggered from the axis of rotation of the front coulter 37. Thus the two rotational axes are neither collinear nor coaxial. Both coulters are also toed-in, and mounted with positive camber, as explained in detail hereinafter. Preferably, the coulters penetrate eighteen to twenty inches below soil level. The coulter edges 38 around the outer diameter of each coulter are sharpened to enhance soil penetration. The angular configuration or placement of the coulters results in a tapered, "V-shaped" furrow that is very narrow at the bottom, yet approximately two to three inches wide at the top. The plane occupied by the rear, trailing coulter 36 intersects the plane occupied by the front, leading coulter 37, and the rear coulter almost touches the front coulter.

Referring primarily to FIGS. 1, 4-6, and 7, each coulter 36, 37 is securely mounted to the frame 30 with a rigid bracket 40 that is shaped like an inverted "U." Each bracket 40 has a pair of downwardly projecting, spaced apart and parallel sides 41, 42. Sides 42 comprise rigid, flat, rectangular plates that are welded to the frame rail 27. The sides 41 are offset from the frame rails 26 or 27 by rigid spacers 44 welded to frame 30. At the lower extremity of each bracket side 41 or 42 is a suitable pillow block 46. Each coulter is rotatably secured between sides 41, 42. A pair of similar, axially aligned, pillow blocks 46 receive and journal axles 48 that concentrically project away from the centered, coulter hubs 50. Axles 48 are coaxial with the hubs 50 and the coulters that they rotatably mount. It is important that the coulters 36, 37 rotate; one benefit is that the normal build-up of mud is attenuated by the scraping or cleaning action of steel wipers 39 (i.e., FIG. 4). Partly as a result of the latter construction, the planter traverses mud without jamming.

Each coulter 36, 37 is thus positioned between opposite sides 41, 42 of the mounting bracket 40. However, as apparent from FIG. 7, leading coulter 37 is positioned within bracket 40 in a position generally to the left of center; conversely, trailing coulter 36 is positioned somewhat to the right of center.

Figure 7:
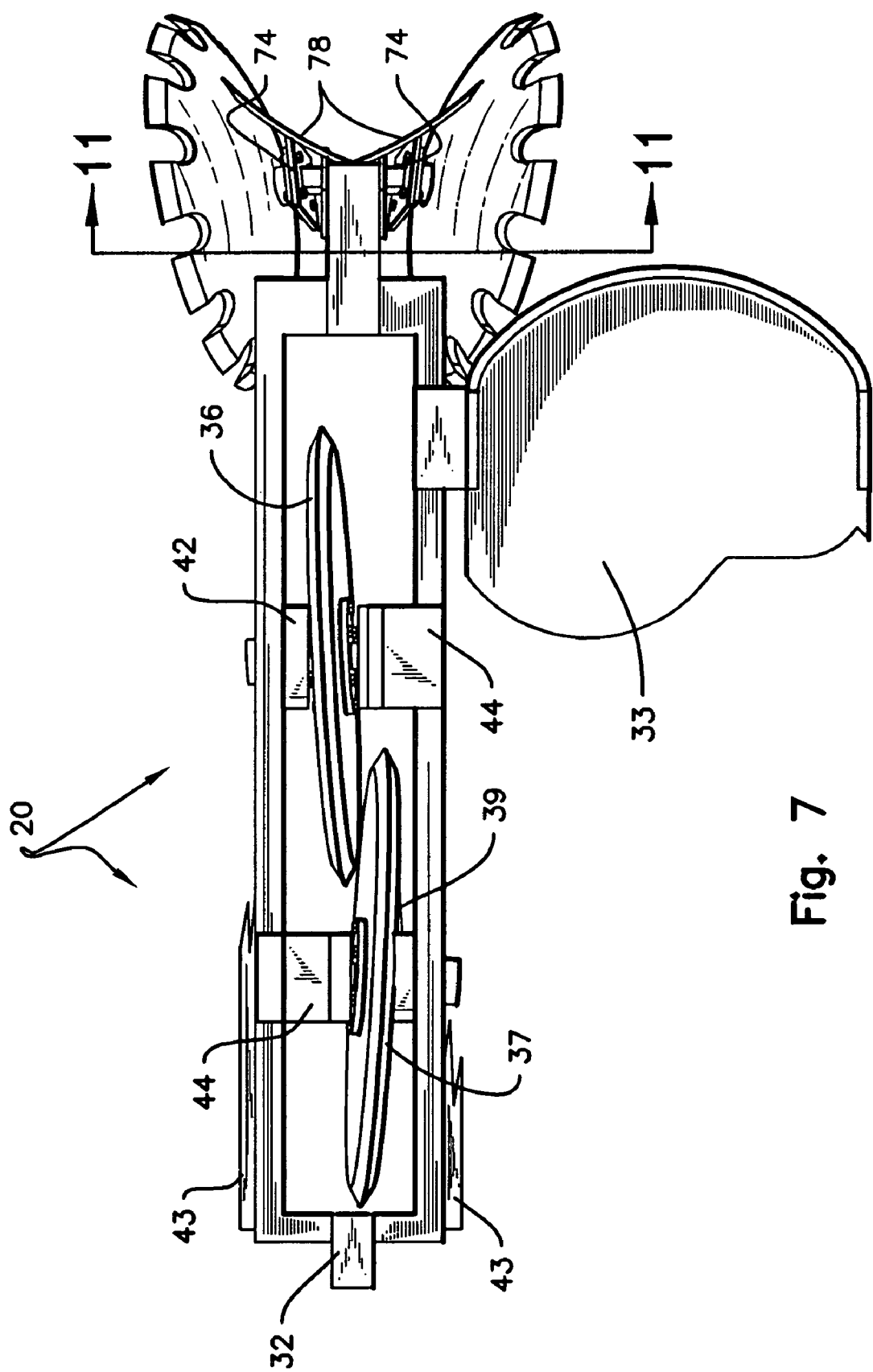
FIG. 7 is a fragmentary top plan view.
Figure 8:
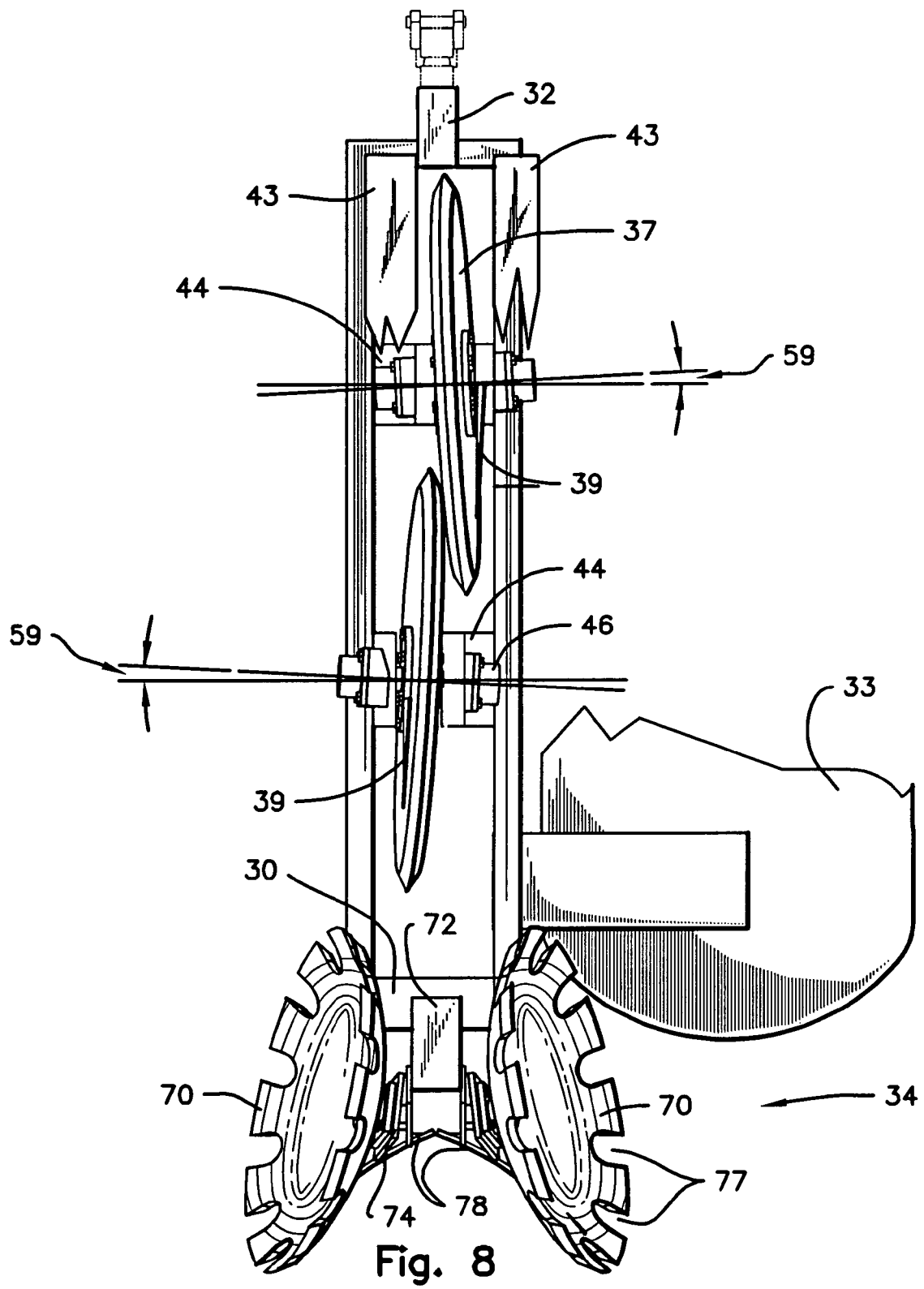
FIG. 8 is a fragmentary bottom view thereof.
Figure 9:
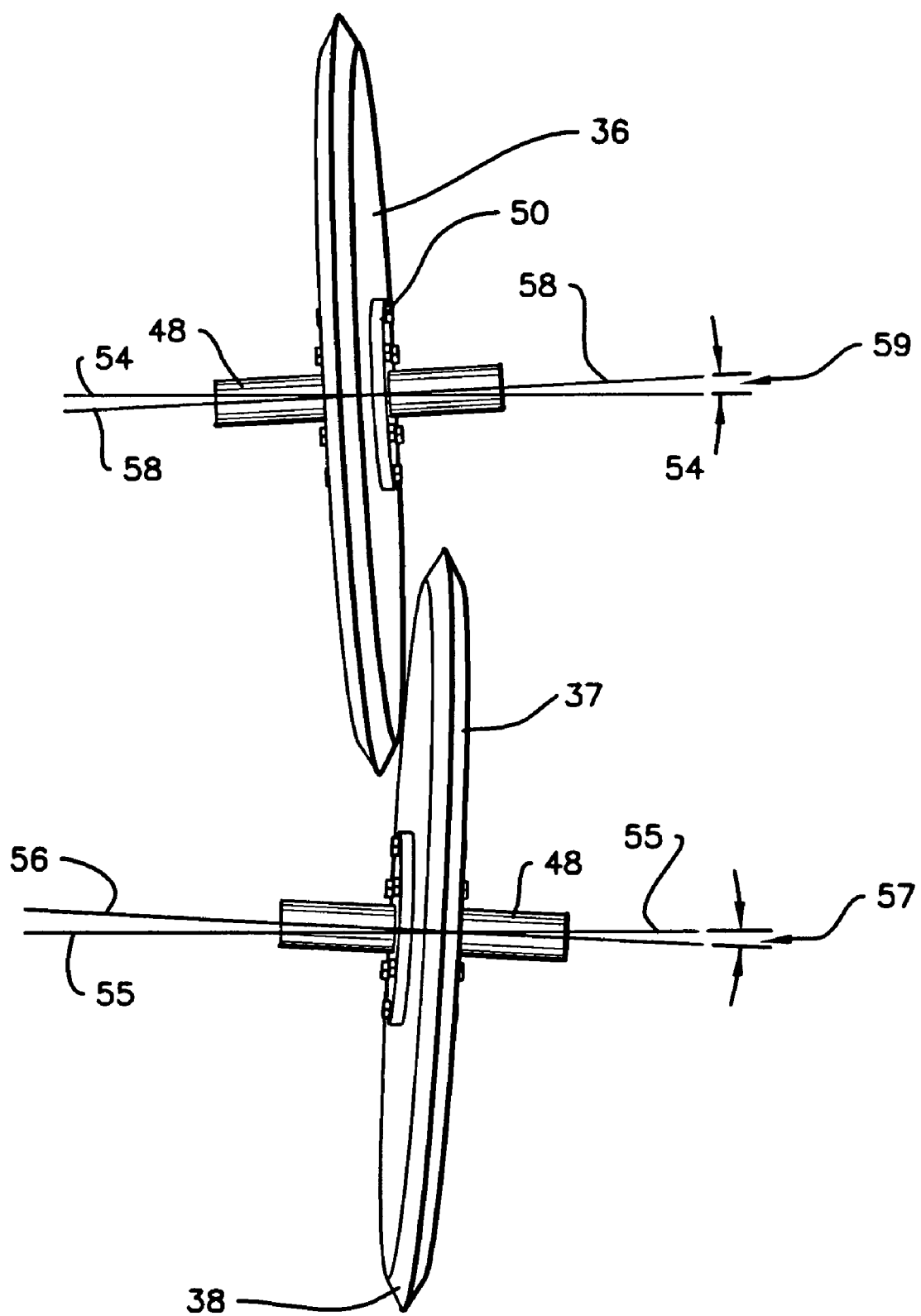

Furthermore, as will be appreciated from an inspection of FIGS. 7-9, the axis of rotation of coulter wheel 36 (i.e., as established by its axles 48) is staggered from the axis of rotation of coulter 37, and it is neither coaxial, coincident, collinear, or aligned therewith. It will also be appreciated that the trailing coulter 36 is close enough to the leading coulter 37 and oriented such that it almost physically contacts it at a surface point located approximately midway between the coulter wheel circumference and center. In the best mode, the front and rear coulters are both forty inches in diameter. In the best mode the leading edge of rear or trailing coulter 36 is positioned 0.250 inches from the front or leading coulter 37, and this edge is approximately 0.250 inches behind hub 50 of coulter 37.

The preferred carbon steel wipers 39 (FIG. 1) terminate proximate each coulter to remove soil buildup. In the best mode the wipers 39 are affixed 0.125 inches from each coulter to prevent soil buildup and jamming.

Primarily referencing FIG. 9, the spaced apart-coulters 36, 37 are toed-in. For reference purposes, horizontal lines 54 and 55 respectively designate hypothetical lines that are parallel both to each other and to a flat lower supporting surface (i.e., the field). Lines 54, 55 are perpendicular to the longitudinal axis of the planter that is longitudinally coincident with the center of frame 30. The axis of rotation of leading coulter 37 established by its axles 48 is designated by line 56. Lines 55, 56 intersect and form a toe-in angle, generally designated by the reference numeral 57. Similarly, the axis of rotation of trailing coulter 36 established by its axles 48 is designated by line 58. Lines 54 and 58 intersect, forming a tow-in angle, generally designated by the reference numeral 59. The preferred toe-in angle of each coulter is ten degrees. It is also preferred that coulter 36 almost touches coulter 37, as explained above, and as seen, for example, in FIG. 9.

Optional four-inch by one half inch skids or sleds 43 (FIG. 1) are preferably disposed on each side of the planter 20. These comprise flat plates running approximately from the coulters beneath their pillow blocks which act as debris wipers and to pass over solid obstacles, such as stumps, rocks, etc.

Figure 10:
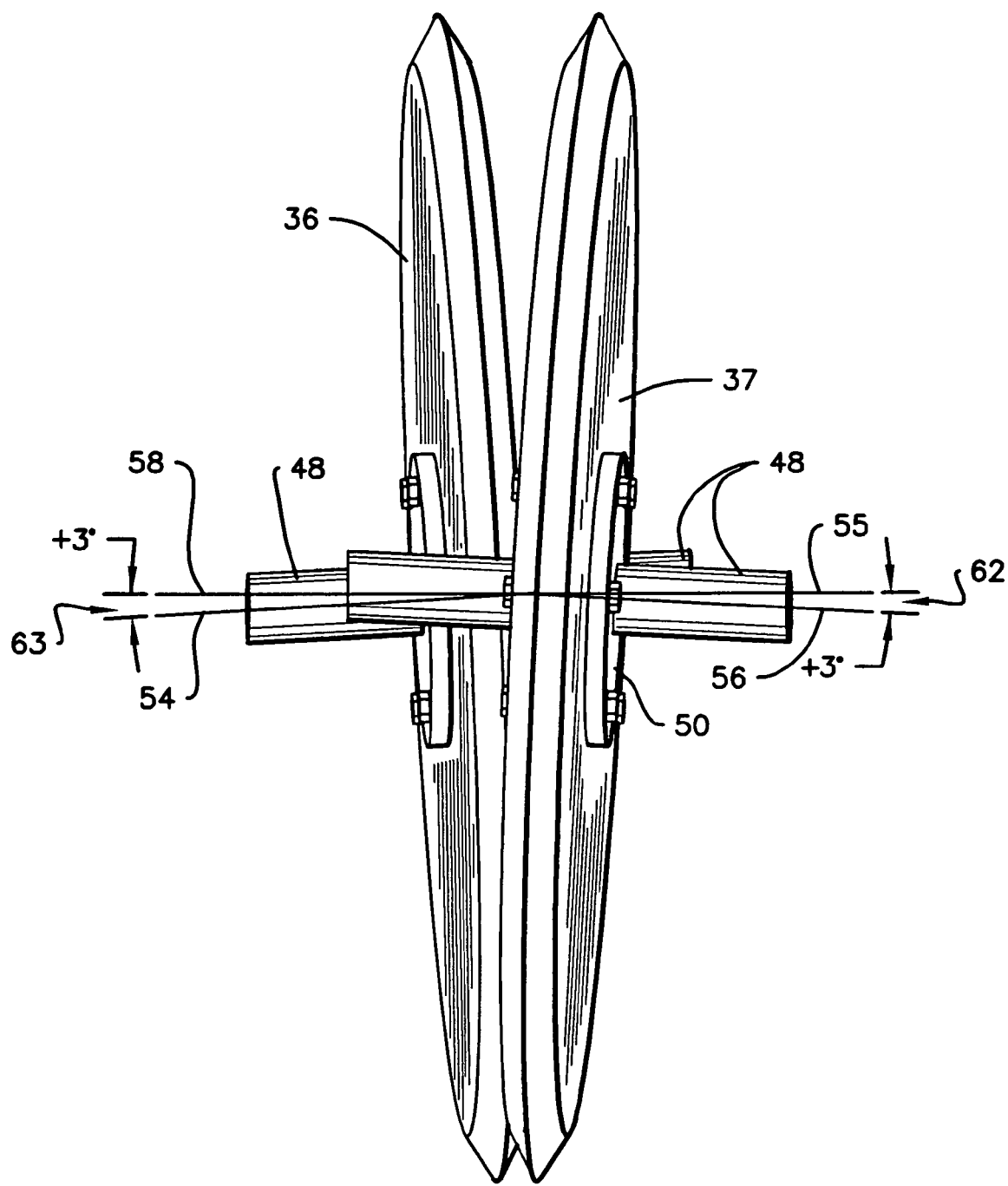
FIG. 10 is a fragmentary front plan view of the front coulter disks, showing the preferred staggered mounting and the preferred positive camber; and, FIG. 11 is an enlarged, fragmentary, sectional view of the packer wheels, taken generally along line 11-11 of FIG. 6.
Figure 11:
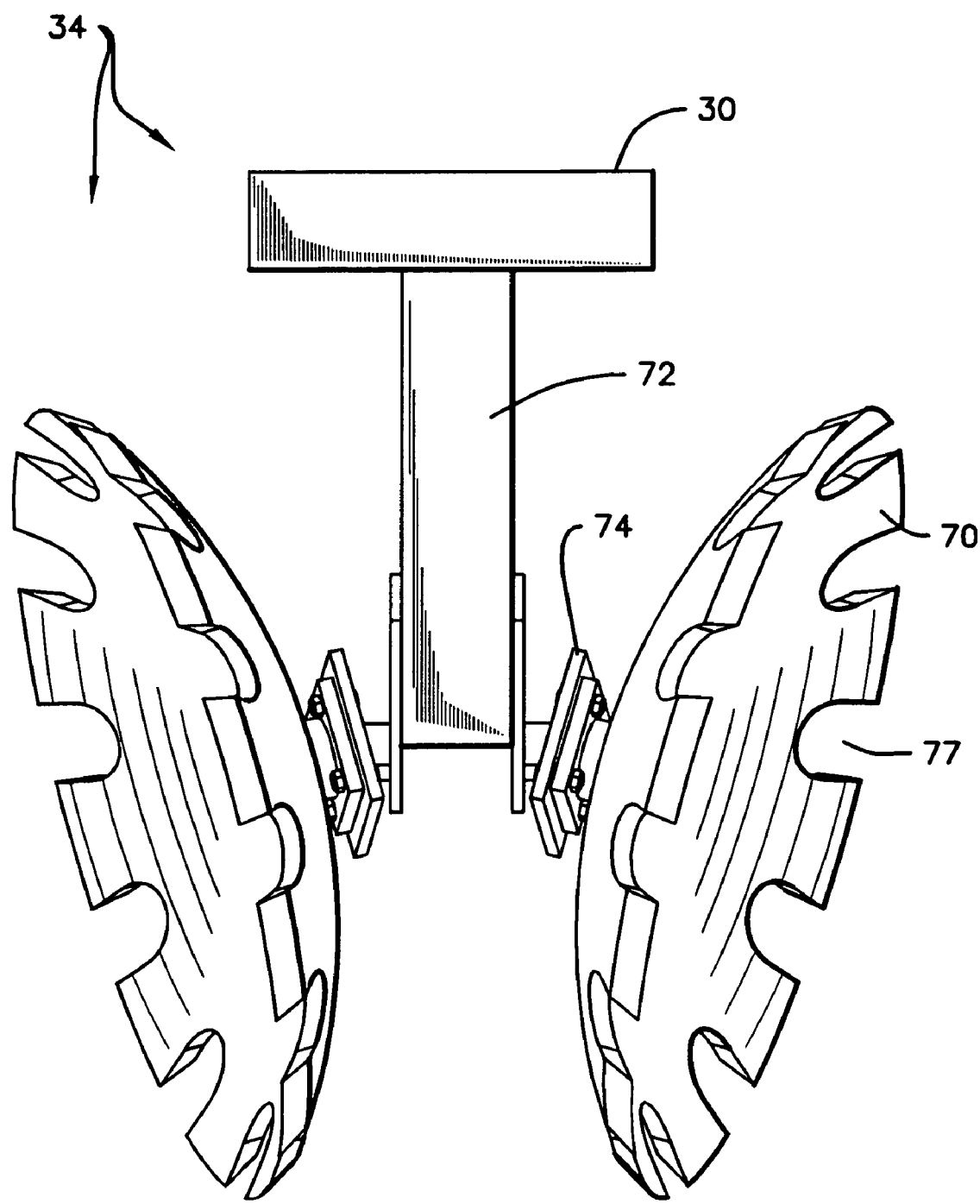

Referencing FIGS. 9 and 10, it is important that the coulters are positively cambered. Horizontal reference lines 54, 55 are again shown, as are the axes of rotation, 56, and 58. As seen in this view, the positive camber of leading coulter 37 is indicated at 62, and the positive camber of coulter 36 is indicated at 63.

With primary reference directed now to FIGS. 1, 3, 8, and 11, the packer wheel assembly 34 comprises a pair of spaced-apart packer wheels 70 that are inclined at the back of the frame 30. Wheels 70 are each connected to frame strut 72 by the combination of an axles and a pillow block assembly 74 that is similar to the coulter pillow blocks and axles discussed previously. Each of these convex packer wheels 70 is scalloped, in that there are a plurality of notches 77 cut into the radial periphery of each packer wheel. As is the case with the previously described coulters, packer wheels 70 are toed in and positively cambered. The preferred packer wheel tow-in and camber is approximately 22.5 degrees. Scallops 77, that are radially spaced-apart around the outer diameter of the packer wheels 70, assist in ground-driven rotation. Each packer wheel 70 is preferably thirty-six inches in diameter, and they are asymmetrically opposed to each other. Scrapers 78 (FIG. 1) reduce unwanted soil and mud buildup.

Operation:

After the furrow is opened by the coulters 36, 37, the operator drops seedlings manually through to the ground. After the coulter wheels initially penetrate and engage the ground, the spaced apart, trailing packer wheels 70 close the furrow. These dual concave disks are preferably scalloped. On each side of the v-shaped furrow, the packer wheels penetrate the ground and effectively compress and reposition loosened dirt to close the furrow over the seedbed, with the seedling roots appropriately buried and the seedlings disposed substantially vertically for favorable initial growth. The preferred packer wheels remove air pockets that might otherwise form. Furthermore, the preferred packer wheel configuration leaves irrigation trenches 28, 29 on either side of the closed seedbed, so the young seedlings are more likely to enjoy favorable moisture conditions.

The operator, facing in the direction of travel sits on the left-hand side of the seedling planter on seat 33, the center of which is preferably placed approximately twelve inches behind and eight inches above the axis of rotation of trailing coulter disc 36. This position places the center of the operator seat approximately thirty inches in front of the center of the packer wheels 70. The ergonomics of this arrangement is comfortable for the operator and provides easy access to the seedbed below for placing the seedling. Preferably the cab 31 is heated for operator comfort and protection during periods of inclement weather or during operation in forested or brushy areas.

The penetration depth of packer wheels 70 is controlled with a hydraulic cylinder (not shown), with hydraulic pressure being supplied by the machine used to propel the seedling planter. If hydraulic power is unavailable, the closing-disc depth may be controlled by means of a spring-loaded mechanism or through a hydraulic accumulator to maintain constant down pressure.

As the operator releases the seedlings into the trench, the packer wheels 70 bring the soil toward the center trench. The maximum trench compaction occurs when a seedling is directly under the horizontal axis of the wheels 70. At this time, the soil is firmly compacted around the seedling from the bottom of the seedbed to the top, thereby eliminating inadvertent air pockets around the seedling roots.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A seedling planter device for digging a single tapered and V-shaped furrow, the device comprising:

an elongated, rigid frame having a front and a rear and a pair of elongated sides;

a tow connection point at the front of said frame enabling the planter device to be towed over a field in the direction of travel;

front and rear coulters rotatably secured to said frame between said sides for cutting and opening said furrow in which seedlings are to be planted, each coulter having an axis of rotation, and wherein:

the coulters are staggered and the axis of rotation of the rear coulter is longitudinally spaced apart from the axis of rotation of the front coulter;

the rotational axes of said coulters are neither coplanar nor coaxial;

the front and rear coulters are toed-in and mounted with positive camber; and, during operation when the front and rear coulters are covered with soil said rear coulter physically contacts the front coulter; and, a packer wheel assembly mounted at the rear of the frame for closing the furrow after planting a seedling.

2. The planter as defined in claim 1 further comprising wipers terminating proximate each coulter to remove soil buildup.

3. The planter as defined in claim 1 wherein the toe-in is approximately ten degrees.

4. The planter as defined in claim 3 wherein the positive camber is approximately three degrees.

5. The planter as defined in claim 1 wherein the packer wheel assembly comprises a pair of spaced-apart packer wheels that are inclined, towed in and cambered and wherein each packer wheel has a plurality of radially spaced apart peripheral notches.

6. A heavy-duty seedling planter comprising:
- an elongated, rigid frame having a front and a rear and a pair of elongated sides;
- front and rear, staggered, coulters rotatably secured to said frame between said sides for cutting and opening a tapered and V-shaped furrow in which seedlings are to be planted, wherein the rear coulter is longitudinally spaced apart from the front coulter;
- wherein the rotational axes of said coulters are neither coplanar nor coaxial, and the front and rear coulters are toed-in and mounted with positive camber;
- wherein during operation when the front and rear coulters are covered with soil said rear coulter physically contacts the front coulter;
- wipers terminating proximate each coulter to remove soil buildup; and,
- a packer wheel assembly mounted at the rear of the frame for closing the furrow after planting a seedling, the packer wheel assembly comprising a pair of spaced-apart, inclined packer wheels that each have a plurality of radially spaced apart, peripheral notches.

7. The planter as defined in claim 6 wherein the coulter toe-in is approximately ten degrees and the coulter positive camber is approximately three degrees.

* * * * *